INVENTOR.
ROBERT M. GOODMAN
BY
Nelson E. Kimmelman
ATTORNEY

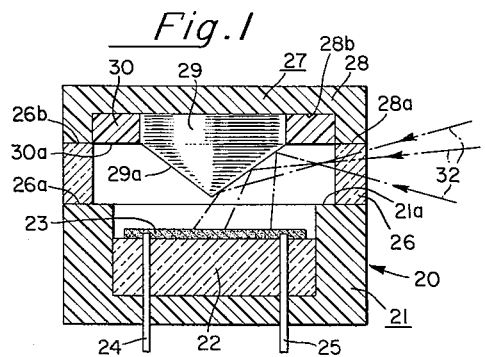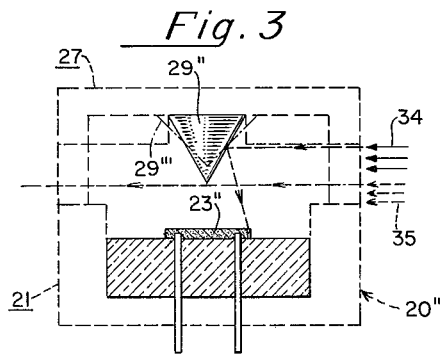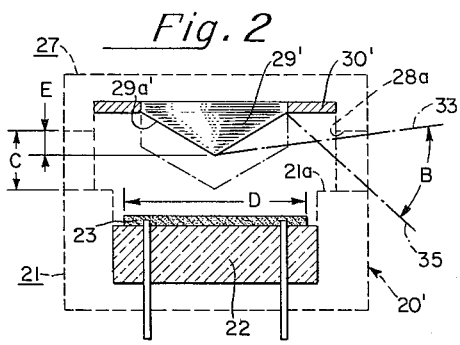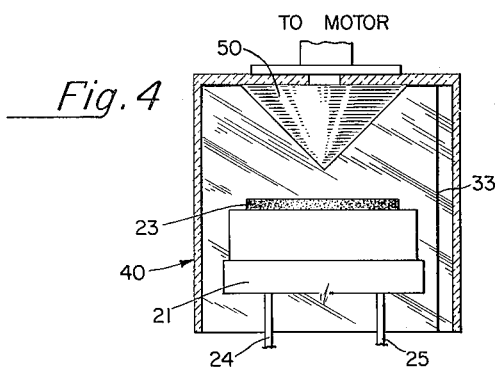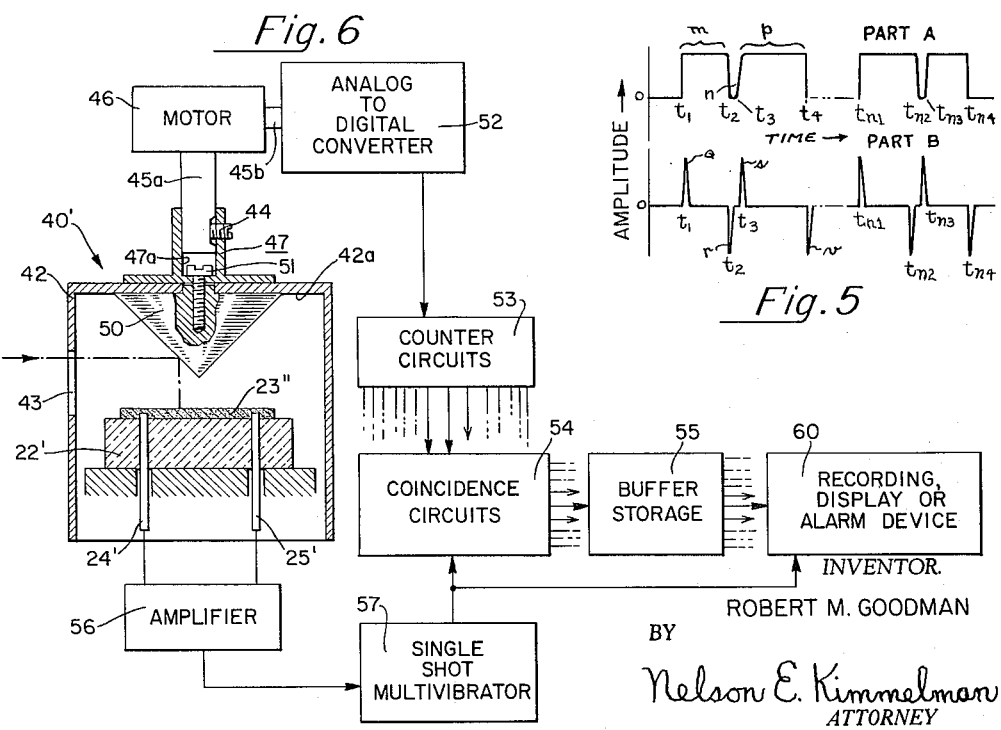
INVENTOR.
ROBERT M. GOODMAN
BY Nelson E. Kimmelman
ATTORNEY Dec. 28, 1965 R. M. GOODMAN 3,226,557
PHOTOSENSITIVE SCANNER FOR DETECTING
RADIATION FROM ANY AZIMUTHAL ANGLE
Filed Jan. 18, 1963 3 Sheets-Sheet 2

Dec. 28, 1965    R. M. GOODMAN    3,226,557
PHOTOSENSITIVE SCANNER FOR DETECTING
RADIATION FROM ANY AZIMUTHAL ANGLE
Filed Jan. 18, 1963    3 Sheets-Sheet 3

INVENTOR.
ROBERT M. GOODMAN
BY
Nelson E. Kimmelman
ATTORNEY

United States Patent Office 3,226,557
Patented Dec. 28, 1965

3,226,557
PHOTOSENSITIVE SCANNER FOR DETECTING RADIATION FROM ANY AZIMUTHAL ANGLE
Robert M. Goodman, 200 E. Township Line Road, Elkins Park, Pa.
Filed Jan. 18, 1963, Ser. No. 252,344
14 Claims. (Cl. 250—236)

This invention relates to detectors of radiation and in particular to novel photosensitive detectors and novel scanning systems employing them.

It is among the objects of the present invention to provide:

(1) A novel component or device which has sensitivity to radiation emanating from all or selected azimuthal directions.

(2) A novel device which is sensitive to radiation emanating from all or selected azimuthal directions and having variable sensitivity to radiation from sources at different elevations.

(3) A novel photosensitive device which is sensitive to external radiation from sources in a solid angle surrounding said device.

(4) A novel device which is sensitive to radiation emanating from sources in any azimuthal direction and at any or all elevations within a hemisphere as well as some elevations outside said hemisphere.

(5) A novel scanning system for locating the azimuth of radiation sources.

(6) A novel system for detecting predetermined radiation from any source within a hemisphere of search by scanning, detecting and determining the angular position of said radiation.

FIGURE 1 is a sectional elevation view of a device sensitive to radiation impingement thereon from any azimuth.

FIGURE 2 is a partly phantom sectional and essentially schematic elevation of a structural modification of the apparatus shown in FIG. 1.

FIGURE 3 is a partly phantom sectional and essentially schematic view of another structural modification of the apparatus shown in FIG. 1.

FIGURE 4 is a sectional elevation view of one scanning device based on the principles illustrated in FIG. 1.

FIGURE 5 consists of two waveforms illustrative of the operation of the scanning device shown in FIG. 4.

FIGURE 6 includes a sectional elevation view of the scanning device in a novel scanning system shown schematically, the device utilizing the principles of the form of my invention shown in FIG. 1.

Figure 7:
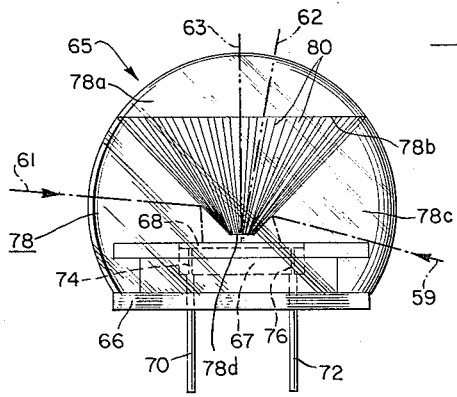

FIGURE 7 is an elevation view of another form of detection device responsive to radiation at all azimuths and all elevations.

Figure 7A:
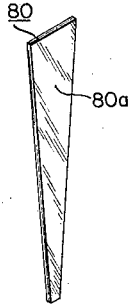

FIGURE 7a is an elevation view of one of the elements of the device shown in FIG. 7.

Figure 8:
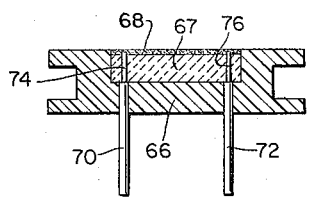

FIGURE 8 is a partly sectional side elevation view of the base of the device shown in FIGURE 7 at one stage in its fabrication.

Figure 9:
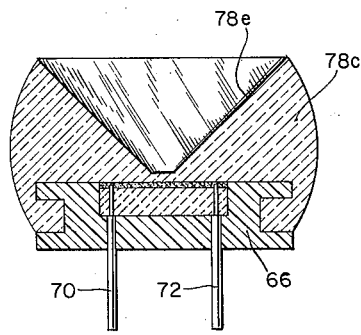

FIGURE 9 is a sectional elevation view of part of the device shown in FIG. 7 at another stage in the fabrication thereof.

Figure 10:
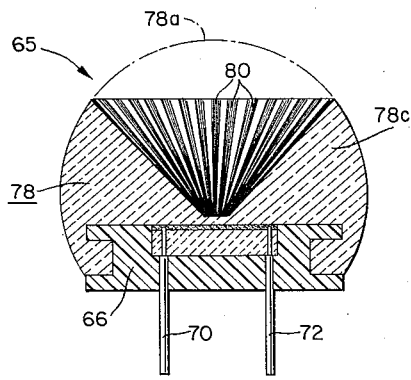

FIGURE 10 is a partially sectional elevation view of the device shown in FIG. 7 at another stage in its manufacture.

Figure 11:
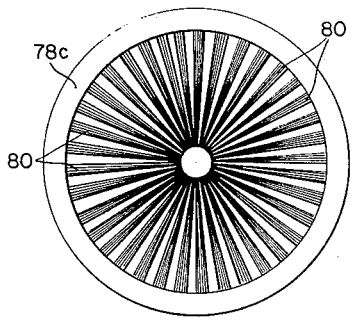

FIGURE 11 is a plan view of part of the apparatus shown in FIG. 10.

Figure 12:
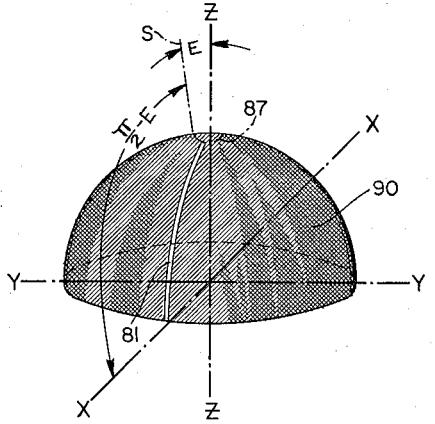

FIGURE 12 is a partially perspective view of one part of a scanning device according to another form of my invention.

Figure 13:
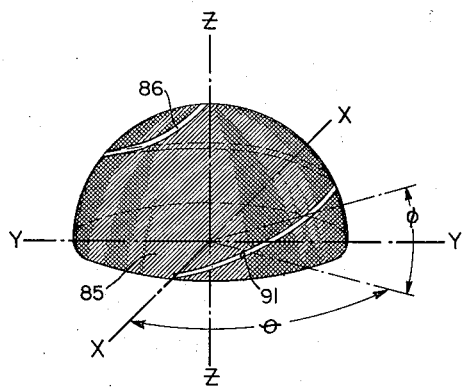

FIGURE 13 is a perspective view of another part of a scanning device which is intended to cooperate with the structure shown in FIG. 12.

Figure 14:
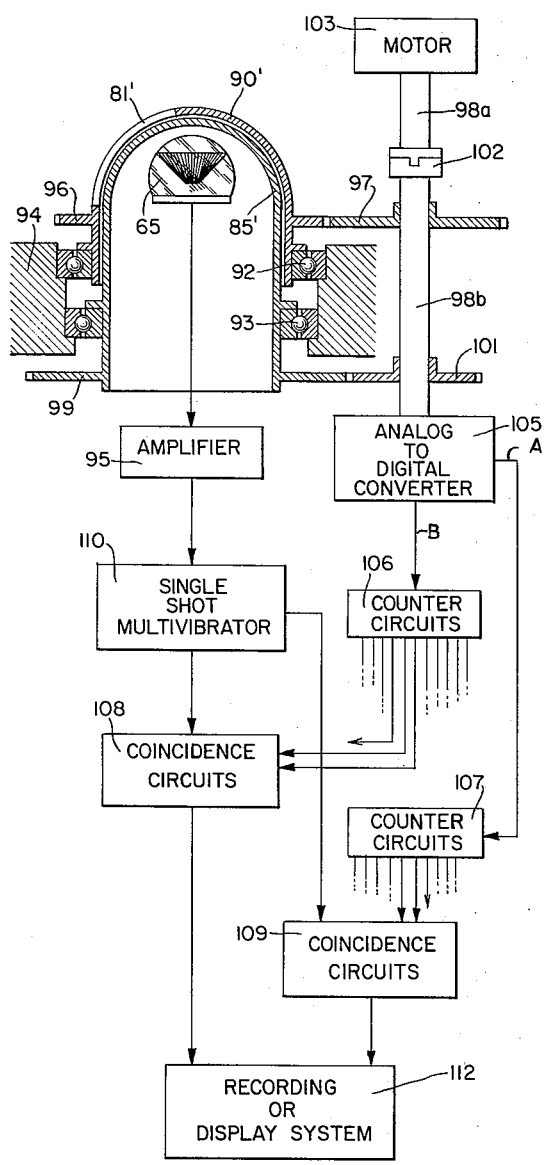

FIGURE 14 is a partially sectional and schematic diagram of a radiation scanning and detecting system employing the device shown in FIG. 7 and the structures shown in FIGS. 12 and 13 as elements thereof.

FIGURE 1 shows a radiation-sensitive device which is sensitive to radiation incident thereupon from all azimuths. The device 20 consists of an opaque plastic cylindrical base-member 21 made of Bakelite or epoxy, for example, which has a generally cylindrical ceramic substrate 22 positioned in a hollowed-out portion thereof. The top surface of the substrate is covered with a layer 23 of a photosensitive material which is shown merely schematically. Two leads 24 and 25 are connected to conductive tabs attached to the photosensitive layer 23 and pass through apertures in the base member 21 for connection to external circuits.

An annulus 26 transparent to radiation to which the device 20 is sensitive is placed on top of the member 21 as shown and may be cemented at its lower edge 26a to the non-reflective surface 21a of the member 21. The annulus 26 may be made of plastic or of a clear vitreous material, for example. On the upper surface 26b of the annulus 26 there is placed a subassembly 27 which consists of a cylindrical plastic cap 28 which may be formed of the same opaque plastic material as the bottom member 21. The lower surface 28a may also be cemented to the top surface 26b. Within the cap 27 there is located at the center a pointed member 29 made of brass, for example, whose lower exposed surface 29a is highly polished to reflect radiation to which the layer 23 is sensitive. The member 29 may be cemented or otherwise attached to the inner surface 28b of the cap 28. If desired, an annular plastic or metal member 30 can be employed as a spacer to center and fix the position of the member 29. The lower surfaces 30a and 28a of the annulus 30 and of the cap 28 should be non-reflective.

With this construction it may be seen that rays 32 of the predetermined radiation such as visible light, for example, entering the device 20 through the annular member 26 from any azimuth (0°–360°) will strike the surface 29a and be reflected downward onto the photosensitive layer 23 causing a change in at least one of the characteristics, i.e., conductivity or emission, of the latter depending on the material thereof. This change would appear across the leads 24 and 25 as a change, for example, in resistance or as a pulse of current or as a voltage variation.

It should be understood that when the words "light" and "photosensitive" are used, they refer to radiation in the broadest sense. Thus, the incoming rays could be, for example, infra-red, ultra-violet, visible light, if the photosensitive layer were to be constructed accordingly. It should be understood that, instead of employing the annular member 26, the entire space between the top member 27 and the bottom member 21 could be filled by a transparent plastic substance such as the flexible transparent silicone material "Sylgard" manufactured by Dow-Corning. As a matter of fact there need be nothing but air, some inert gas, a vacuum or space between the assemblies 21 and 27. This could be accomplished by passing a thin support member through the center of the photosensitive layer 23 and embedding one end of it in the substrate 22 while fixing its other end in an aperture at the point of member 29.

FIGURE 2 shows a somewhat modified form 20' of the device and is intended to illustrate the effects of some variations that may be made therein. In FIG. 2, the angle between the lowest and highest rays 35 and 33 of incoming light that can strike the reflective surface 29a' (shown in full lines) is denoted by the angle B. The distance between the surfaces 28a and 21a is indicated by C. The diameter of the photosensitive layer 23′ is indicated by D. The distance between the surface 28a and the projection of the tip of member 29′ is designated E. It may be seen that the angle B is a function of C, D and E. D may, for example, be varied by placing over the layer 23′ a diaphragm or iris (such as is found in cameras) whose aperture size may be adjusted manually or automatically. It may be seen that as C increases, the angle B will increase, and vice versa. Also, as E increases the angle B increases. In addition, the angle that the surface 29a′ makes with respect to the axis of member 29′, also modifies the angle B directly. If the reflecting figure of revolution (29′) and the annulus 30′ were as shown in broken lines in FIG. 2 the angle B would be affected accordingly. In the discussion below of a later figure, a practical way of varying some of these dimensions is illustrated.

Turning now to FIGURE 3, the effect of changing the shape of the reflecting member is shown in the device 20″. If it is as shown by the solid line member 29″ and essentially collimated light is coming in as shown by rays 34, the rays 34 will be reflected by the member 29″ at such an angle that they will not hit the photosensitive area 23″. The rays 35 which are also assumed to be collimated (as they would be if coming from a very distant source) will pass right through the device 20″ without being reflected at all by member 29″.

On the other hand, if the shape of the figure of rotation is changed to approximate member 29‴ the angle at which the rays 34 impinge upon its tapered surface is such that some of them will be reflected onto the layer 23′. The rays 35 will still pass through the device without reflection therein.

While FIGURES 2 and 3 have shown examples where the reflecting body has a conical shape, it should be appreciated that other figures of rotation are also useful. Thus, the reflecting element could be a generally spherical or convex curved surface extending down from the interior of cap 28. Other configurations are possible such as a truncated cone whose lower flat surface might be placed very close to the photosensitive area. Unsymmetrical and irregular reflecting bodies could be desired in certain cases.

With components such as are shown in FIGS. 1–3 or minor modifications thereof, it is possible to design a system for scanning all azimuths and detecting and recording radiation from any azimuth. One such system may employ a device such as is shown in FIGURE 4 which comprises a generally cylindrical member 40 made of a clear plastic material, for example, which transmits desired radiation on to a photosensitive layer 23 mounted upon a substrate 21, there being conductors 24 and 25 connected to the layer 23. On the inside surface of the member 40 there is a vertical line 33 which may be a thin black paint stripe or a hairline, for example. The member 40 includes a reflective body 50 connected to its top interior surface for rotation therewith. The body 40 is rotated by a motor (not shown). If this assembly is placed within a totally dark surrounding atmosphere, there will be no signal at time t1 (FIG. 5, Part A) produced between the conductors 24 and 25. If a source of radiation comes within the ambit of the scanner and passes through the member 40 onto the reflecting body 50 and is reflected thereby onto the photosensitive layer, there will be produced across the leads 24 and 25 a signal m extending from time t1 to time t2. The leading edge of this portion m may be differentiated by conventional circuits (not shown) to produce a positive-going spike Q (Part B, FIG. 5) which occurs at the instant the radiant source is first detected. Until such time t2 as the hairline 33 revolved to a position in which it was interposed between the device 40 and the source, the signal would remain at the level of portion m. When the radiation incident upon the device 40 is blocked from impinging on the photosensitive layer during the interval t2–t3 by the passage of the hairline 33 between them, the signal will be sharply and momentarily reduced as shown at n. The negative-going leading edge, if differentiated, would produce the negative spike r whereas the positive-going trailing edge would produce the positive spike s. When the hairline moves on at time t3, the signal produced by the photosensitive layer across leads 24 and 25 in response to the radiation (portion p) will resume its former level. It will remain there until time t4 when the source passes out of the ambit of the scanning device. At the latter time, t4, the negative-going pulse edge, when applied to a differentiating circuit, would produce a negative-going spike v as shown in FIG. 5, Part B.

From the foregoing it may be seen that a scanning, detecting and azimuth-determining system can be devised. In this system the azimuthal position of the device 40 and hence the position of its hairline could be indexed and so arranged that when the negative pulse n was produced and differentiated (spike r) a recorder would be activated to record the azimuthal position of the line 33 thereby identifying the direction whence the radiation emanated. As a matter of fact, however, it is more advantageous to employ a scanning device which produces an output signal only when a certain region thereof is aligned with the radiation source and permits the radiation to impinge on the photosensitive layer. Such a system could be one in which the member which revolved about the photosensitive device would be opaque throughout except for a thin vertical slit or portion transparent to the radiation.

Turning now to FIGURE 6 there is shown a scanning device indicated generally at the numeral 40′ which consists of photosensitive layer 23″ deposited upon a substrate 22′ made of ceramic or other appropriate material. Leads 24′ and 25′ are connected to conductive tabs attached to the layer 23″. An opaque cylindrical shell 42 is mounted for rotation around the photosensitive device 40′. The shell may be made of a thin metal or of plastic and it include a radiation-transmissive aperture or slit 43. If the shell 42 is made of metal, there will be a slit; if it is made of a clear plastic the aperture may be an unpainted (non-opaque) area whereas the rest of the shell may be covered with non-transmissive or otherwise opaque paint. The shell 42 is attached by a set screw 44 to a shaft 45a that is connected to a motor 46. The lower end of the shaft 45a is journalled within the bore 47a of a sleeve member 47 that is connected to the top of the shell 42 by adhesives, solder, welding, or other means depending on the material used for the shell. There is a pointed reflecting body 50 connected to the surface 42a by means of a bolt 51 which passes through an aperture in the end of the sleeve 47 and into threaded engagement with an axial aperture in the member 50.

As the scanning device 40 rotates, the slit 43 permits radiation from predetermined elevations and azimuths to impinge upon and be reflected by the body 50 onto the photosensitive surface 23″. The rotary position of the shell 42 and hence the direction whence radiation emanates may be ascertained by coupling the shaft 45b of the motor 46 to an analog-to-digital converter 52 (sometimes known as a "digitizer" or a "shaft-position encoder"). Converter 52 produces digital pulses in response to and as determined by the annular rotation of the shaft 45. These pulses are fed to counter circuits 53 whose outputs are applied to coincidence circuits 54.

At a given rotary position of the device 40′ radiation from a source within the volume scanned by device 40′ will pass through the slit 43 onto the photosensitive layer 23 and will cause the latter to produce, for example, a pulse which is amplified by amplifier 56 and applied to a conventional single-shot multivibrator 57 or a blocking oscillator. Either of the last-named circuits will produce a single uniform rectangular or other type pulse in response to each trigger pulse supplied thereto. The output pulse of multivibrator 57 is applied to coincidence circuits 54 which thereupon release the digitized data in the counter 53 to buffer storage circuits 55 where they may be temporarily stored.

The digital data released to the buffer storage 55 is that data which was in counter 53 because of the position of shaft 45b at the instant radiation from the detected source passed through slit 43. At the same time the multivibrator pulse may be applied to a recording device 60 to clear it for reception of new data. The outputs of the circuits 55, in turn, are applied to an appropriate recording, display, or alarm device 60. The recording device may be an electromechanical type printer or a high-speed cathode-ray-photographic printer, for example. Alternatively it could be a cathode-ray device which actually portrays the azimuthal position in alpha-numeric characters.

It will be seen that it is easy to substitute other figures of revolution for the member 50 merely by removing the shell 42 from the shaft 45 by loosening the set screw 44 and then unscrewing the bolt 51. Then another reflective body having different characteristics can be used for a different desired scanning pattern as mentioned previously in connection with FIGURES 2 and 3. If desired the width or length of the slit may also be changed by providing appropriate shutters therefor associated with the member 42. Actually the entire shell 42 with its reflective member can be detached from the shaft 45a by loosening set-screw 44 and an entirely different assembly can be substituted therefor.

The previous figures all concerned a scanning device which had relatively limited elevation sensitivity. FIGURE 7 depicts a device which has 360° azimuthal sensitivity and, in addition, has sensitivity to radiation originating anywhere within a hemisphere of infinite radius. It consists of a device 65 composed of a base 66 having a recess in which a ceramic substrate 67 is placed. Atop the substrate 67 is a photosensitive layer 68 to which leads 70 and 72 are connected by conductors 74 and 76, for example. The leads 70 and 72 pass through and project from the base 66 for connection to an appropriate external circuit. There is a transparent plastic, slightly more than hemispherically-shaped body 78 which has disposed therein a number of triangular or wedge-shaped strips 80 of reflective material whose narrower ends lie in a circular horizontal plane portion 78d and whose broader ends lie in a different horizontal plane area indicated generally at 78b. The strips 80 are spaced from one another and are disposed with their reflective surfaces 80a (FIG. 7a) outward. Each of them has its tapered end inclined inwardly toward the plane 78d, the broader portions being angled outwardly. It will be seen that a ray of light 59 entering slightly below the plane of the substrate 68 can strike one of the strips 80 and be reflected onto the photosensitive surface 68. Light from other angles, such as the ray 61 can also strike a strip 80 and be reflected to the surface 68. Light, such as the ray 63 coming from directly above the hemisphere at 78 can pass through the spaces between adjacent ones of the strips 80 and strike the substrate 68 directly. Ray 62 also passes between strips 80.

The construction of the device 65 is shown in successive steps in FIGURES 8, 9 and 10. In FIG. 8 the base 66 is constructed with apertures and then the ceramic substrate 67 having the photosensitive surface 68 is placed within the recess therein. The base 66 should be opaque and insulating and may be made of an epoxy-type of plastic, if desired. The leads 70 and 72 may be connected to the conductors 74 and 76 by means of a conducting epoxy cement, if desired.

FIGURE 9 shows the addition of the transparent member 78c which has a funnel-shaped interior surface 78e. The material used for 78c may be a clear solid flexible plastic such as the aforesaid silicone-based "Sylgard." This material has not been found to cause any harmful effect when it is disposed in intimate contact with the layer 68. Of course, other transparent plastic or vitreous materials with similar properties may alternatively be used.

FIGURE 10 shows how the reflective strips 80 are next laid onto the surface 78e. As an example of such materials, thin strips of aluminum foil may be employed. To immobilize them on the surface 78e, a thin coating of the same material used for the portion 78c, but in its uncured state, may first be applied to the surface 78e. FIGURE 11 is a plan view showing how the device in FIG. 8 appears after the strips 80 are inserted.

After the strips 80 are in place, the final step is to produce a generally top-shaped member 78a whose tapered lower surface contacts and mates with the surface 78e. This may be done by making member 78a of the same plastic material as the rest of the hemisphere 78 which, when cured, will blend with the surface 78e so that there will be no visible or undesirable optical interfaces.

FIGURES 12 and 13 show two shell-like objects which may be used together with the device 65 to form a scanning device. This device comprises an opaque shell 90 having a transparent slit 81 which is placed over another shell 85 which is slightly smaller in diameter than the shell 90. It will be noted that the lower end of the slit 86 terminates at the X axis whereas its upper end crosses over the generally circular area enclosed by the broken-line circle 87 of FIG. 12. When so positioned the slits 81 and 86 will coincide only at one certain point indicated by the circle 91, for example.

If the shells are rotated relative to one another it may be seen that the coincidence aperture 91 may be made to scan in a tight spiral-shaped scanning pattern in the course of which light external thereto can enter the coincidence aperture from points at all azimuths and elevations within the hemisphere being scanned. The particular azimuthal angle and elevation can be determined by indexing the positions of the two shells as they rotate.

To take an illustrative example, let us assume that the angle subtended by the slit 81, that is the angle between the X axis and the line S (which originates at the junction of axes X, Y and Z and intersects the circle 87) is $$\frac{\pi}{2}-E \qquad (1)$$

The locus of the intersections of the line S and all other lines so constructed with the shell 90 forms the circle 87. The area within circle 87 is intended to depict an area in which it is not desired to permit coincidence of the slits 81 and 86. This is necessary to prevent ambiguity that might otherwise arise if the top and bottom portions of the slit simultaneously coincided with different portions of the slit 86.

The locus of the slit 86 on shell 85 corresponds to the formula $$\frac{\Theta}{4}=\phi \qquad (2)$$

It may be seen that when $\phi=0$, $\Theta=0$, when $\phi=45°$, $\Theta=180°$, when $\phi=90°$, $\Theta=360°$.

All other intermediate points of the slit 86 may be similarly plotted.

If the shells are made to rotate about the Z axis at different speeds and if shell 90 rotates at a speed which is greater than the speed of shell 85, the coincidence aperture 91 will follow a path (up and along the slit 86) in which the angle $\phi$ increases whereas if its speed is lower, the angle $\phi$ will decrease.

An entire typical system which employs these shells will now be explained in connection with FIG. 14. It is assumed that the speed of shell 90' is to be $200\pi$ radians per second or 6000 r.p.m., the speed of shell 85' is to be $150\pi$ radians per second or 4500 r.p.m., and that the composite scanning hemisphere structure (90', 85') produces a complete spiral scan in one second. As shown in FIGURE 14 the shell 90' which is hemispherically shaped at its top and cylindrical toward its bottom is shown placed over and very close to the shell 85' which is similarly constructed except that it is slightly smaller. The shell 90' is supported by appropriate bearings 92 and 93 on a stationary body indicated at numeral 94. Within the shell 85' is the device 65 (FIG. 7) whose output is schematically shown connected to the input of an amplifier 95. The shell 90' is surrounded by a gear 96 which meshes with a gear 97 that is fixedly mounted on a shaft 98b. The shell 85' is surrounded by a gear 99 at its lower portion which meshes with a corresponding gear 101 fixedly mounted on shaft 98b. The gears 97 and 101 are driven by rotary motion imparted to the shaft 98b by a clutch 102 that is coupled to a motor 103 via shaft 98a. The shaft 98b is also connected to an analog-to-digital converter 105 (or shaft-position encoder) which produces pulses in response to the rotation of shaft 98b. One output of the converter or encoder 105 is applied to counter circuits 106 and another output is applied to counter circuits 107. The output of counter 106 is applied to coincidence circuits 108 whereas the output of counter 107 is applied to coincidence circuits 109.

The signal appearing in the output of the amplifier 95 due to reception of radiation is applied to a single-shot multivibrator 110 or equivalent which produces a uniform gating pulse in response to the radiation-produced signal from the amplifier. The multivibrator 110 has two outputs one of which is applied to the coincidence circuits 108 whereas the other is applied to the coincidence circuits 109. The outputs of the coincidence circuits 108 and 109 are applied to a recording or display system indicated generally at the numeral 112. As in the system shown in FIG. 6 intermediate or buffer storage may be provided between the coincidence circuits 108, 109 and the recording system 112.

It will be seen that the gear 97 drives the gear 96 at a rate faster than the gear 101 drives the gear 99. Hence, the shell 90' which revolves at $200\pi$ radians or 100 revolutions per second goes around faster than shell 85' which is rotating at $150\pi$ radians or 75 revolutions per second. The converter 105 is so constructed that it will have one output A containing one pulse produced per degree of rotation, i.e., 36,000 pulses per second. The counter 107 which receives the 36,000 pulses per second is constructed to count a number which corresponds to the number of degrees in azimuth that the slit in the shell 90' has traveled in the course of a designated revolution of the shaft 98b.

The converter 105 is also constructed to produce in another output B one pulse for each revolution of the shell 85', i.e., 100 pulses per second. This second output signal is applied to counter 106 which, therefore, indicates the total number of revolutions the shell 90' has made in any particular total scan of the hemisphere. When a radiation signal is received by the device 65 through coincidence aperture 90 at a certain rotational position of the shells 90' and 85', the device 65 will produce a pulse that will be amplified by the amplifier 95. The output of the latter is applied to a conventional single-shot multivibrator 110 (or any equivalent single pulse-producing circuit) which, in response to the possibly irregular or varying amplitude pulse fed therein, produces a single rectangular gating pulse of constant amplitude.

This gating pulse is fed to both of the coincidence circuits 108 and 109 and causes them to release to their respective output circuits the numbers contained in counters 106 and 107 respectively at that instant. These numbers which represent respectively (1) the azimuth in degrees and (2) the total number of complete revolutions made in any complete spiral scan (i.e., the time elapsed from the start of the scan in units of 0.01 second) are applied (through buffer storage circuits if desired) to an appropriate recording or display system 112. If the system 112 is a recorder, it will print out the two sets of numbers which can then be calibrated against plotting tables to determine the exact azimuth and elevation whence the radiation originated.

Therefore, to obtain the elevation $\phi$ from which the radiation signal emanated it is only necessary to substitute the known values in the following equation:

$$\phi \text{ rad.} = \frac{(\omega_1 - \omega_2)t}{100} \quad \begin{array}{l} \text{where } \omega_1 \text{ and } \omega_2 \text{ equal the} \\ \text{respective velocities (in} \\ \text{radians) of shells 90'} \\ \text{and 85'} \end{array}$$

$$= \frac{\pi}{2}t$$

where $t$ = the reading of the counter 106 in seconds times $10^{-2}$.

*Modifications and variations*

In some applications it may be desired to scan within a constant horizontal plane once a radiation-emitting object of search has been detected. For example, if a radiation source is approaching the scanning system and its elevation angle $\phi$ is constant, once its radiation is initially detected, a gearshift-clutch assembly could be provided that would change the gear ratios of the gears on shaft 98b so that shells 90' and 85' were driven at the same rate of speed.

While the slit 86 is designed according to the formula $$\frac{\theta}{4} = \phi$$

it should be appreciated that many other types of slit configurations may be used. For example, complex spiral functions can be designed so that only special volumes of the total hemisphere are scanned and/or so scanned that the time in any particular part of a volume may be equal to or different than the time spent in scanning any other portion of the volume. Also, more than one slit may be used on each of the shells to achieve desired special scanning patterns.

The system of FIG. 14 employs two hemispherical-shaped shells to obtain azimuth and elevation information concerning an external radiation source but other shaped bodies can also be used. For example, if it is not desired to search the whole hemisphere, two cylindrical shells, one placed over the other may be used. The outer shell could have a vertical straight slit whereas the inner shell could have a slit which starts at the lower edge thereof and circles in a spiral about that shell and ends at the top thereof. Thus, instead of gleaning just azimuthal information, elevation data could also be obtained as well. As in the system of FIG. 14, the two shells could be rotated at different speeds, but instead of using the device 65, the photosensitive device could be substantially similar to the one shown in FIG. 1.

It should also be appreciated that instead of using a shell or cylindrical body having a hairline 33 as shown in FIGURE 4 which rotates about the photosensitive device, a simple vertical wire could be mounted for movement around it. It should be appreciated that both in this alternative form and in the form shown in FIG. 4 it is not necessary for the reflecting body 50 to revolve with the wire or the hairline as it can perform its function just as well if it is stationary.

It is, of course, possible to devise other systems which employ the shells shown in FIGS. 12 and 13 and, in modified form, in FIG. 14. These other systems would utilize a different scanning pattern due to changes in the configuration of the slits 81 and 86, or their equivalents in the form of opaque lines on otherwise transparent shells. Also, the movement of the shells or their equivalents need not be unidirectional as shown in connection with FIG. 14; their movement could be pivotal. For example, the shell 90 could pivot back and forth about the X axis whereas the shell 85 would pivot back and forth at a different rate about the Y axis. Another possibility would be to use one shell which is substantially spherical and has a slit which approximates a great circle, and arrange it to rotate clockwise about the X axis. A second spherical shell with a similar slit but in a quadrature relation to the first slit could be made to rotate clockwise about the Y axis but at a different velocity. Of course, many other variations are possible depending on the objectives to be accomplished. These variations which do not depart from the essence of this invention will undoubtedly occur to those skilled in the art upon perusing this application. Consequently, I desire my invention to be limited solely by the claims herein.

I claim:

1. A system for scanning and detecting predetermined radiation comprising:
   (a) sensing means responsive to said radiation,
   (b) an optical means for directing light from any azimuthal angle onto said radiation-responsive means,
   (c) means which moves about said radiation-responsive means and which includes a predetermined portion thereof which is opaque to said radiation, said radiation-responsive means producing a signal when said moving means is in a certain position with respect to an external source of said radiation,
   (d) means for continuously indexing the position of said moving means, and
   (e) means for producing, in response to reception of said signal at any position of said moving means, output signals representative of the position of said external source at the time said signal occurs.

2. The system according to claim 1 wherein said moving means revolves around said radiation responsive means, wherein said indexing means continuously indexes the angular position of said moving means, and wherein said output signal-producing means is coupled to said indexing and to said radiation-responsive means.

3. A system for scanning and detecting predetermined radiation comprising:
   (a) sensing means responsive to said radiation,
   (b) an optical means for directing light from any azimuthal angle onto said sensing means,
   (c) means which revolves around said radiation-responsive means and which includes a predetermined portion thereof which is opaque to said radiation, said radiation-responsive means being constructed and arranged to produce a signal when said revolving means is in a certain rotary position with respect to an external source of said radiation,
   (d) means for continuously indexing the angular position of said revolving means which produces a continuously signal representative of the instantaneous position thereof, and
   (e) means constructed to receive said signal from said radiation-responsive means and the signal from said indexing means for producing, substantially only at the time they coincide, an output signal representative of the instantaneous position of said external source at said time.

4. A system for scanning detecting predetermined radiation comprising:
   (a) means lying in a first plane which is responsive to said radiation,
   (b) means which revolves around said radiation-responsive means and which includes a predetermined portion thereof which is opaque to said radiation, said radiation-responsive means being constructed and arranged to produce a first signal substantially only when said opaque portion is aligned with respect to an external source of said radiation and thereby prevents said radiation from impinging upon said radiation-responsive means,
   (c) means coupled to said revolving means for producing a continuous second signal representative of the instantaneous angular position thereof, and
   (d) means to which said first and second signals are applied for producing, substantially only at the time they coincide, an output signal indicative of the instantaneous position of said external source at said time.

5. A system according to claim 4 wherein said output signal represents the azimuth at which source is located.

6. A system for scanning and detecting predetermined radiation comprising:
   (a) means lying substantially within a first plane which is responsive to said radiation,
   (b) means which revolves around said radiation-responsive means and which is predominantly opaque to said radiation but also contains a portion thereof transmissive of said radiation, said radiation-responsive means being constructed and arranged to produce a first signal when said transmissive portion is aligned with respect to an external source of said radiation,
   (c) means for continuously indexing the angular position of said revolving means which produces a second continuous signal representative of the instantaneous angular position thereof, and
   (d) means to which said first and second signals are applied which is constructed to produce, substantially only at the time when said first and second signals coincide, an output signal representative of the instantaneous position of said external source at said time.

7. The system according to claim 6 wherein said output signal represents the azimuth of said external source.

8. A system for scanning and detecting predetermined radiation comprising:
   (a) means responsive to said predetermined radiation,
   (b) two-part means surrounding and radiation-responsive means and constructed and arranged to rotate about it, both parts of said rotating means being substantially opaque to said radiation, each having at least one transmissive portion thereof which is constructed and arranged to permit said radiation emanating from a source external thereto to impinge on said radiation-responsive means,
   (c) means coupled to said two-part rotating means for continuously indexing the angular position thereof as it rotates, and
   (d) means coupled to said indexing means and to said radiation-responsive means for producing, in response to said radiation passing simultaneously through both of said transmissive portions onto said radiation-responsive means, an output signal representative of the angular position of said source of said incident radiation.

9. A system for scanning and detecting predetermined radiation comprising:
   (a) a first generally hollow body which includes a first generally hemispheric portion having a predetermined area thereof transmissive of said radiation,
   (b) a second generally hollow body which includes a second generally hemispheric portion having a predetermined area thereof transmissive of said radiation, the other parts of said first and second hemispheric portions being opaque to said radiation, said second body being somewhat smaller than said first body and being arranged within said first body,
   (c) means generally surrounded by said first and second bodies which is constructed to be responsive to said radiation impingement thereupon from sources at any point above a predetermined plane,
   (d) means for revolving said bodies at selected respective speeds about said radiation-responsive means,
   (e) first means for indexing the angular position of said first body which produces a first signal representative of the angular position thereof, (f) second means for indexing the angular position of said second body which produces a second signal representative of the angular position thereof, (g) means coupled to said radiation-responsive means for producing an output signal substantially only when radiation from any of said sources passes through aligned parts of said transmissive areas of said first and second portions, (h) a first coincidence detection means to which said output signal and said first signal are applied, (i) a second coincidence detection circuit to which said output signal and said second signal are applied, and (j) means coupled to said first and second coincidence circuits for utilizing said first and second signals when they are passed by said coincidence circuits in response to the application of said output signal thereto.

10. A system for scanning and detecting predetermined radiation comprising:

(a) a first shell-like body which is generally hemispheric and has a first elongated area thereof which transmits said radiation and other areas thereof opaque thereto, (b) a second shell-like body which is generally hemispheric and has a second elongated area thereof transmissive of said radiation and other areas thereof opaque thereto, said second area having a different configuration from said first area, said second body being slightly smaller than and being disposed within said first body, (c) means responsive to said radiation impingement thereupon from sources at any point above a predetermined plane, said radiation-responsive means being positioned to be surrounded generally by said first and second shell-like bodies, (d) means for revolving said first and second bodies at selected different speeds about said radiation-responsive means, (e) means coupled to said revolving means for producing first and second signals respectively representative of the angular positions of said revolving first and second bodies, (f) first and second counters to which said first and second signals are respectively applied, (g) means coupled to said radiation-responsive means for producing uniform pulses whenever radiation from said sources passes through aligned parts of said elongated transmissive areas, (h) first and second coincidence circuits to which said first and second signals are respectively applied and to which said uniform-pulses are also applied, said coincidence circuits being adapted to produce respective output signals containing said first and second signals whenever said pulses are applied thereto, and (i) means adapted to receive and utilize said respective output signals.

11. The system according to claim 10 wherein said means for revolving said first and second bodies includes a rotating shaft, wherein said means for producing said first and second signals includes an analog-to-digital converter, and wherein said output signal utilization means includes indicating means.

12. The system according to claim 11 wherein said first and second shell-like bodies are equipped with respective different sized gears, wherein said rotating shaft is equipped with corresponding different sized gears which mesh with the gears of said shell-like bodies, and wherein said analog-to-digital converter is coupled to said rotating shaft.

13. The system according to claim 10 wherein said first elongated transmissive area has a projection which is substantially rectilinear, and wherein said second elongated transmissive area is substantially helical.

14. The system according to claim 10 wherein said radiation-responsive means includes a photosensitive body lying substantially in a given plane and also includes a plurality of spaced elements having surfaces which reflect said radiation and which are disposed on one side of said body and at an angle thereto, said elements being so disposed that when said radiation penetrates said aligned parts and passes through the spaces between said elements it falls directly on said body, whereas when said radiation enters through said aligned parts and impinges on said reflective surfaces it is reflected onto said body.

References Cited by the Examiner

UNITED STATES PATENTS

| | | | |
|---|---|---|---|
| 1,926,824 | 9/1933 | Stogoff | 250—236 X |
| 2,674,700 | 4/1954 | Small | 250—216 |
| 2,709,224 | 5/1955 | Garnick | 250—239 |
| 2,859,653 | 11/1958 | Blackstone et al. | 178—7.6 |
| 2,952,778 | 9/1960 | Henderson | 250—239 X |
| 2,964,636 | 12/1960 | Gary | 250—211 |
| 2,997,539 | 8/1961 | Blackstone | 178—7.6 |
| 2,997,598 | 8/1961 | Gramm | 250—236 |
| 3,004,162 | 10/1961 | Menke | 250—236 X |
| 3,031,582 | 4/1962 | Benner et al. | 250—239 |
| 3,087,987 | 4/1963 | Stone | 178—7.6 |

RALPH G. NILSON, *Primary Examiner.*

WALTER STOLWEIN, *Examiner.*

J. D. WALL, *Assistant Examiner.*